(12) United States Patent
Mulcahy et al.

(10) Patent No.: US 11,282,379 B2
(45) Date of Patent: Mar. 22, 2022

(54) SLOWDOWN DETECTION

(71) Applicant: INRIX Inc., Kirkland, WA (US)

(72) Inventors: David Mulcahy, Manchester (GB); Dominic Jason Jordan, Manchester (GB)

(73) Assignee: INRIX Inc., Kirkland, WA (US)

(*) Notice: Subject to any disclaimer, the term of this patent is extended or adjusted under 35 U.S.C. 154(b) by 338 days.

(21) Appl. No.: 16/525,658

(22) Filed: Jul. 30, 2019

(65) Prior Publication Data

US 2020/0143669 A1    May 7, 2020

Related U.S. Application Data

(60) Provisional application No. 62/754,208, filed on Nov. 1, 2018.

(51) Int. Cl.
| | |
|---|---|
| *G08G 1/01* | (2006.01) |
| *G06N 3/08* | (2006.01) |
| *G08G 1/052* | (2006.01) |
| *G06N 7/00* | (2006.01) |

(52) U.S. Cl.
CPC .......... *G08G 1/0141* (2013.01); *G06N 3/08* (2013.01); *G06N 7/005* (2013.01); *G08G 1/0129* (2013.01); *G08G 1/0133* (2013.01); *G08G 1/052* (2013.01)

(58) Field of Classification Search
CPC .... G08G 1/0141; G08G 1/0129; G08G 1/052; G08G 1/0133; G08G 1/0112; G06N 3/08; G06N 7/005; G06N 20/00; G06N 3/0454
See application file for complete search history.

(56) References Cited

U.S. PATENT DOCUMENTS

2017/0243121 A1\*  8/2017  Lai ..................... G08G 1/0129

\* cited by examiner

*Primary Examiner* — Yuen Wong
(74) *Attorney, Agent, or Firm* — Cooper Legal Group, LLC

(57) ABSTRACT

One or more techniques and/or systems are provided for slowdown detection. Location data received from vehicles traveling a road is evaluated to identify a road segment associated with vehicle speeds below a threshold. A space-time diagram is generated, and location data associated with vehicles traveling the road segment are plotted within the space-time diagram. The space-time diagram is processed using a convolutional neural network to determine a probability that the space-time diagram illustrates a slowdown. If the probability that the space-time diagram illustrates the slowdown is greater than a threshold, then a notification of the slowdown is transmitted to one or more computing devices associated with vehicles that may encounter the slowdown.

20 Claims, 9 Drawing Sheets

SLOWDOWN DETECTION

RELATED APPLICATIONS

This application claims priority to U.S. Provisional Patent Application No. 62/754,208, filed on Nov. 1, 2018 and titled "SLOWDOWN DETECTION," which is incorporated herein by reference.

BACKGROUND

Slowdowns can occur quickly and without warning along a road. A slowdown is where vehicles are rapidly slowing down in a short distance with little warning due to various conditions (e.g., congestion due to drivers braking to look at a car accident). Slowdowns can lead to serious accidents because drivers must slow vehicles down quickly within a short distance due to having little to no forewarning of the need to slowdown. Thus, it is imperative to provide drivers with warnings of slowdowns in a timely manner so that drivers can perform preventative actions.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for slowdown detection are provided. In an embodiment, location data, such as global positioning system (GPS) data, is received from vehicles traveling a road. The location data is evaluated to identify a road segment associated with vehicle speeds below a threshold of speed (e.g., road segments where vehicles are traveling a threshold amount slower than a speed limit).

A space-time diagram is generated based upon the location data received from the vehicles. Location data of the road segment and/or surrounding road segments may be used to generate the space-time diagram. A first axis of the space-time diagram represents distance along the road segment(s) and a second axis of the space-time diagram represents time. Location data associated with vehicles traveling the road segments(s) is plotted within the space-time diagram. In this way, the space-time diagram represents locations of cars along the road segment(s) over time, which is referred to as vehicle trajectories that are indicative of vehicle speeds. A vehicle trajectory of a vehicle corresponds to location data of the vehicle plotted within the space-time diagram. The more horizontal a vehicle trajectory (e.g., the more parallel to the first axis representing distance along the road segment(s)), the faster a vehicle is traveling. The more vertical a vehicle trajectory (e.g., the more parallel to the second axis representing time), the slower the vehicle is traveling. Also, colors may be assigned to vehicle trajectories based upon ranges of vehicle speeds, such as a green color (or any other color) for free flowing vehicles that are traveling close to the speed limit and a red color (or any other color) for congested flow vehicles traveling well below the speed limit.

Machine learning functionality (e.g., a convolutional neural network or any other neural network or machine learning or image processing/recognition/classification) is executed to process the space-time diagram to output probabilities of whether the space-time diagram illustrates a slowdown or whether the space-time diagram does not illustrate a slowdown. In an embodiment, a convolutional neural network has been trained to utilize image recognition functionality to detect whether space-time diagrams illustrate slowdowns of vehicles based upon trajectories of vehicles, colors of vehicle trajectories, and/or features extracted from the space-time diagram (e.g., slopes of trajectories indicating vehicles speeds, changes in slopes of trajectories indicating quick/sharp vehicle speed changes, shape features, length and size features, etc.).

In an embodiment, the probabilities are above a threshold indicative of a slowdown, then recent location data of vehicles traveling the road segment(s) are clustered such as by using a k-means clustering algorithm on GPS vehicle speed data. In an embodiment, a regression convolutional neural network, trained to detect pixels within space-time diagrams representing transition points (e.g., back end of queue of a slowdown), is executed to identify a current transition point between free flow vehicle traffic and congested flow vehicle traffic. The transition point is used to separate vehicle speeds into separate clusters (e.g., a first cluster of vehicle speeds obtained before the vehicles reach the transition point and a second cluster of vehicle speeds obtained after the vehicle reached the transition point). A difference between a first median of a first cluster of free flow vehicle speeds and a second median of a second cluster of congested flow vehicle speeds is determined. A dangerous slowdown is detected if the difference in cluster medians exceeds a speed threshold.

Outlier vehicle speeds may be removed from the clusters, such as by using a Hampel filter. A difference between a median of a cluster of slow vehicle speeds and a median of a cluster of free flowing vehicle speeds is identified. If the difference exceeds a threshold, then the slowdown, such as a dangerous slowdown, is detected. The clusters and the medians can be used to identify a precise location of the slowdown along the road segment(s). A notification can be transmitted to vehicles traveling routes that will encounter the slowdown while the slowdown is predicted to be occurring. The notification can comprise the location of the slowdown, an alternative route that avoids the slowdown, audible and/or visual warnings, a predicted end time that the slowdown is predicted to dissipate, a time of the slowdown, a predicted new location of a backend queue of vehicles slowed down by the slowdown, and/or other information.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
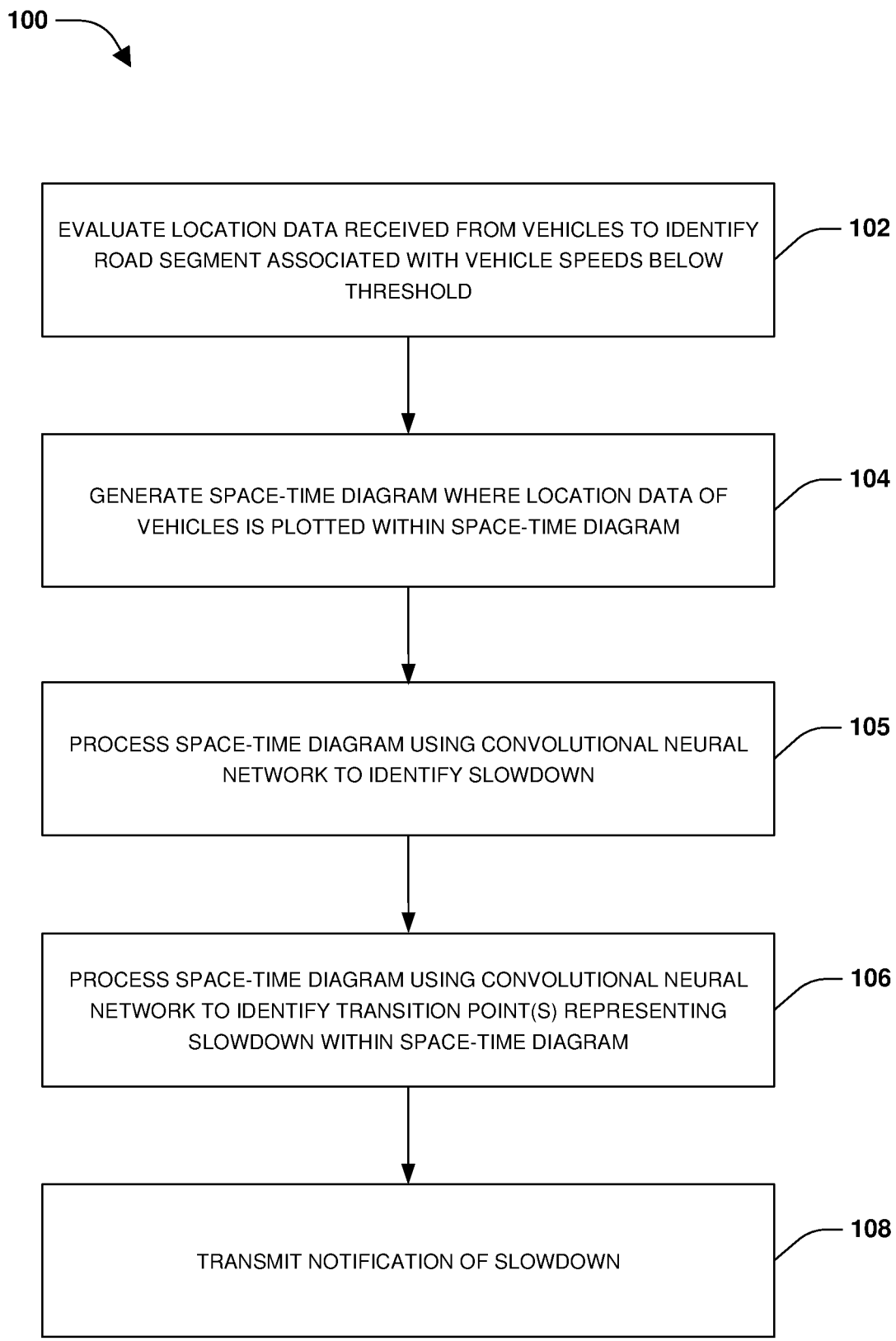
FIG. 1 is a flow diagram illustrating an exemplary method of slowdown detection.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for slowdown detection are provided. Current technological processes for detecting slowdowns are imprecise and result in many false positives where a slowdown is detected when there is none or no slowdown is detected when there is one. Alerting drivers of slowdowns when there is no slowdown is disruptive and can disrupt the free flow of traffic because vehicles will attempt to preemptively slowdown for the slowdown even though there is no actual slowdown. When drivers are not alerted of slowdowns, then serious accidents can result from drivers being unaware of quickly occurring slowdowns without warning. Current technological processes are imprecise because they merely search for slowdowns based upon whether data indicates that a speed difference between a road segment and an upstream road segment is greater than a threshold. Such techniques are also unable to locate precise locations of slowdowns, and may merely attempt to locate a slowdown between 2 road segments even though the slowdown may occur anywhere within one of the road segments.

Accordingly, as provided herein, conventional technological processes for detecting slowdowns are improved by processing location data of vehicles to generate a time-space diagram that is processed using machine learning such as a convolutional neural network or any other machine learning technique to determine whether the time-space diagram illustrates a slowdown. This improves the precision of detecting slowdowns so that drivers can be alerting in a timely manner to improve traffic safety without providing false positives that decrease traffic safety and/or hinder the flow of traffic.

In an embodiment, a particular type/degree of slowdown, such as a dangerous slowdown, a moderate slowdown, a continuous spectrum of different degrees of slowdowns, etc. is detected. A type/degree of slowdown may be detected based upon certain properties of the slowdown, the time-space diagram, and/or vehicle location/speed data. For example, a dangerous slowdown is detected if a difference between free flowing traffic speed and congested flow traffic speed (e.g., a transition from free flowing to congested flow traffic, such as a backend of queue of the slowdown where vehicle are abruptly slowing down) is greater than a threshold such as 65 kph or any other threshold speed value. A dangerous slowdown relates to a lack of opportunity for a driver to adequately slowdown in time, which can be identified by slopes of vehicle trajectories within the space-time diagram that correspond to certain amounts of deceleration over short distances. In another example, a continuous spectrum or multiple types/degrees of slowdowns can be identified (e.g., very dangerous slowdown corresponding to 70 kph, a dangerous slowdown corresponding to 65 kph, a moderately dangerous slowdown corresponding to 50 kph, etc.), where each type of slowdown corresponds to a degree or severity of danger of a slowdown. The different degrees/types of slowdowns can be identified based upon different threshold speed values or slopes of vehicle trajectories (e.g., a steeper slope may be indicative of a more dangerous type of slowdown).

Figure 7:
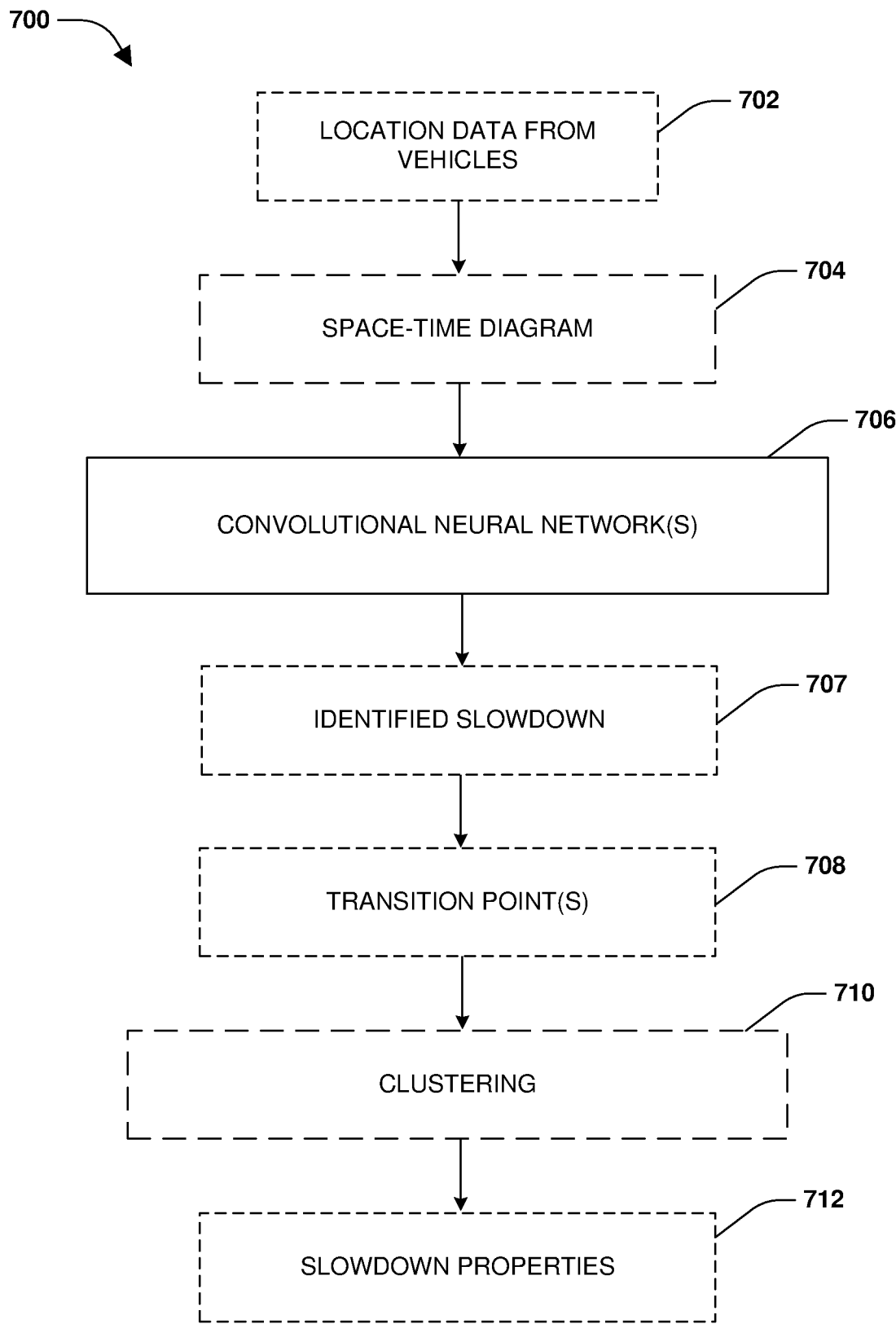
FIG. 7 is a component block diagram illustrating an exemplary system for slowdown detection.

An embodiment of slowdown detection is illustrated by an exemplary method 100 of FIG. 1, and is described in conjunction with system 700 of FIG. 7. Location data 702 is received from vehicles traveling along roads over time. For example, GPS data, indicative of location and/or speed of vehicles, is received over a network from GPS devices of the vehicles. At 102, the location data is evaluated to identify a road segment associated with vehicle speeds below a threshold. In an embodiment, a plurality of road segments having vehicle speeds below the threshold are identified as candidate road segments for further processing to determine whether such road segments are experiencing slowdowns. The threshold may be an adjustable threshold that is based upon a speed limit of individual road segments. Thus, vehicle speeds below the threshold may be indicative of vehicles traveling at a congested traffic flow that is less than a current speed limit. Vehicle speeds at or above the threshold may be indicative of vehicles traveling at a free flow traffic speed around the current speed limit.

At 104, a space-time diagram 704 is generated based upon the location data 702 for the road segment. In an embodiment, the space-time diagram 704 is generated for an extended road segment comprising the road segment and one or more surrounding road segments. The space-time diagram 704 comprises a first axis such as an x axis that represents distance along the road segment. The space-time diagram 704 comprises a second axis such as a y axis that represents time. The location data 702 of vehicles traveling the road segment (or the extend road segment) is plotted within the space-time diagram 704. In this way, trajectories of vehicles are represented within the space-time diagram, which correlate to speeds of vehicles traveling the road segment over time. A trajectory of a vehicle may correspond to plots of vehicle locations of the vehicle along the road segment over time, and thus is indicative of a speed of the vehicle over time along the road segment. In particular, a trajectory of a vehicle may corresponding to consecutive points of vehicle locations from the same vehicle along the road segment over time. They are connected by a solid line, and thus indicative of a speed of the vehicle over time along the road segment. Because the convolutional neural network may be trained to evaluate space-time diagrams in order to identify slowdowns, the convolutional neural network may identify the slowdown based upon features (e.g., slopes and locations of trajectories) of the space-time diagram 704, such as changes to the shape of a trajectory that correspond to a change of speed of a vehicle.

A relatively horizontal trajectory (e.g., more parallel to the first axis representing distance along the road segment) is indicative of free flowing traffic (e.g., vehicles traveling at speeds around a speed limit of the road segment). A relatively vertical trajectory (e.g., more parallel to the second axis representing time, which indicates that little progress is being made over time by a vehicle to travel along the road segment) is indicative of congested traffic flow (e.g., vehicles traveling at speeds well below the speed limit). In an embodiment, colors are assigned to vehicle trajectories (e.g., a vehicle trajectory corresponding to plots of vehicle locations of a vehicle within the space-time diagram 704) based upon vehicle speeds represented by the vehicle trajectories. For example, a first color such as red may be assigned to vehicle trajectories indicative of vehicles traveling at congested traffic flow rates (e.g., speeds well below the speed limit), which may be identified based upon vehicle trajectories that are more vertical than horizontal. A second color such as green may be assigned to vehicle trajectories indicative of vehicles traveling at free flowing traffic rates (e.g., speeds around the speed limit), which may be identified based upon vehicle trajectories that are more horizontal than vertical. Other colors may be assigned to other trajectories indicative of traffic flow rates between the free flowing traffic rate and the congested traffic flow rate.

Figure 2:
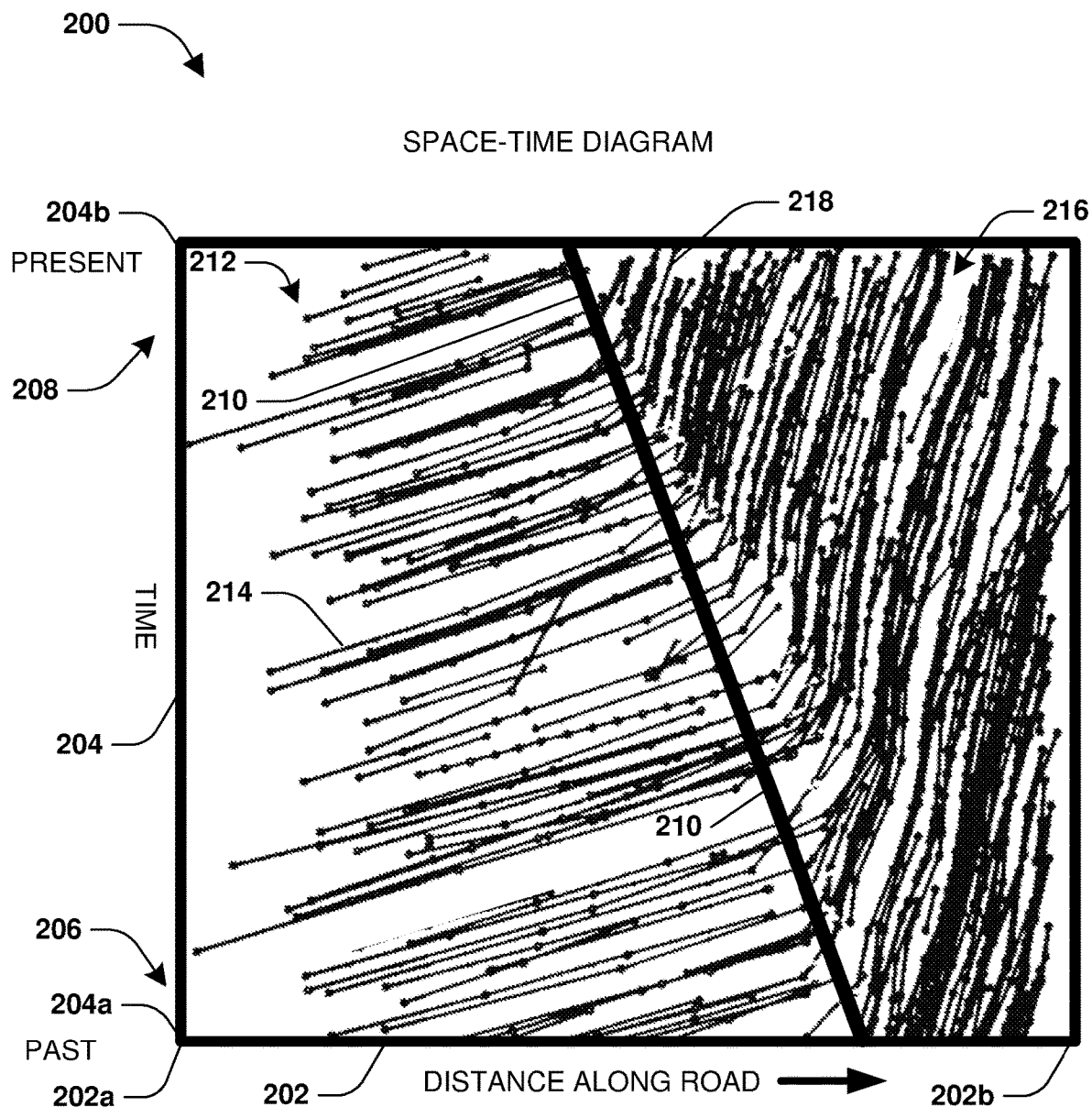
FIG. 2 is an illustration of a space-time diagram that illustrates a slowdown.

FIGS. 2-6 illustrate examples of time-space diagrams that are created from location data of vehicles traveling along road segments. FIG. 2 illustrates a first space-time diagram 200 having an x axis 202 representing distance along a first road segment and a y axis 204 representing time. At the origin of the first space-time diagram 200, the x axis 202 represents a starting position 202a of the first road segment and the y axis 204 represents a starting time 204a that occurred in the past 206. The other end of the x axis 202 represents an ending position 202b of the first road segment. The other end of the y axis 204 represents a most recent time 204b of acquired vehicle speed data (e.g., a more present/current time 208). It may be appreciated that any other time periods, start times, and end times may be represented by the y axis 204.

Location data of vehicles traveling the first road segment are plotted within the first space-time diagram 200. The plotted location data for a particular vehicle may represent a trajectory and/or vehicle speed of the vehicle over time. For example, a first trajectory 214 of location data of a first vehicle indicates that the first vehicle is traveling at a free flowing vehicle traffic rate at a first point in time. This is because the first trajectory 214 is more horizontal than vertical and more parallel to the x axis 202 than the y axis 204, thus indicating that the first vehicle is making progress along the first road segment within a reasonable timeframe (e.g., traveling close to a posted speed limit). A second trajectory 218 of location data of a second vehicle indicates that the second vehicle is traveling at a congested vehicle traffic rate at a second point in time. This is because the second trajectory 218 is more vertical than horizontal and more parallel to the y axis 204 than the x axis 202, thus indicating that the second vehicle is making little progress along the first road segment over time (e.g., traveling well below the posted speed limit).

A change in shape of a trajectory corresponds to a change in speed of a vehicle (e.g., a rapid change in slope corresponds to a rapid acceleration/deceleration of a vehicle). For example, the first trajectory 214 indicates that the first vehicle initially travels at a free flow speed at the first point in time, but at line 210, the first vehicle slows down and the first trajectory 214 corresponds to congested traffic flow at a subsequent point in time. Similarly, the second trajectory 218 at a previously point in time indicates that the second vehicle was initially traveling at the free flow speed, but at line 210, the second vehicle slowed down and the second trajectory 218 corresponds to the congested traffic flow at the second point in time.

As will be described later in further detail, the first space-time diagram 200 can be proceeded to determine probabilities that the first space-time diagram 200 illustrates a slowdown or not. With regard to the first space-time diagram 200, a slowdown is illustrated where free flowing vehicle traffic represented by trajectories 212 is coming to a sudden slowdown as congested flow vehicle traffic represented by trajectories 216. Line 210 represents a transition point where the trajectories of free flowing vehicle traffic transition to trajectories of congested flow vehicle traffic. The transition point represents a back of queue of the slowdown where vehicles are starting to experience the slowdown and suddenly slowdown. The slowdown and the location of the transition point (back of queue) is identified using the convolutional neural network 706 as will be described later in further detail.

Figure 3:
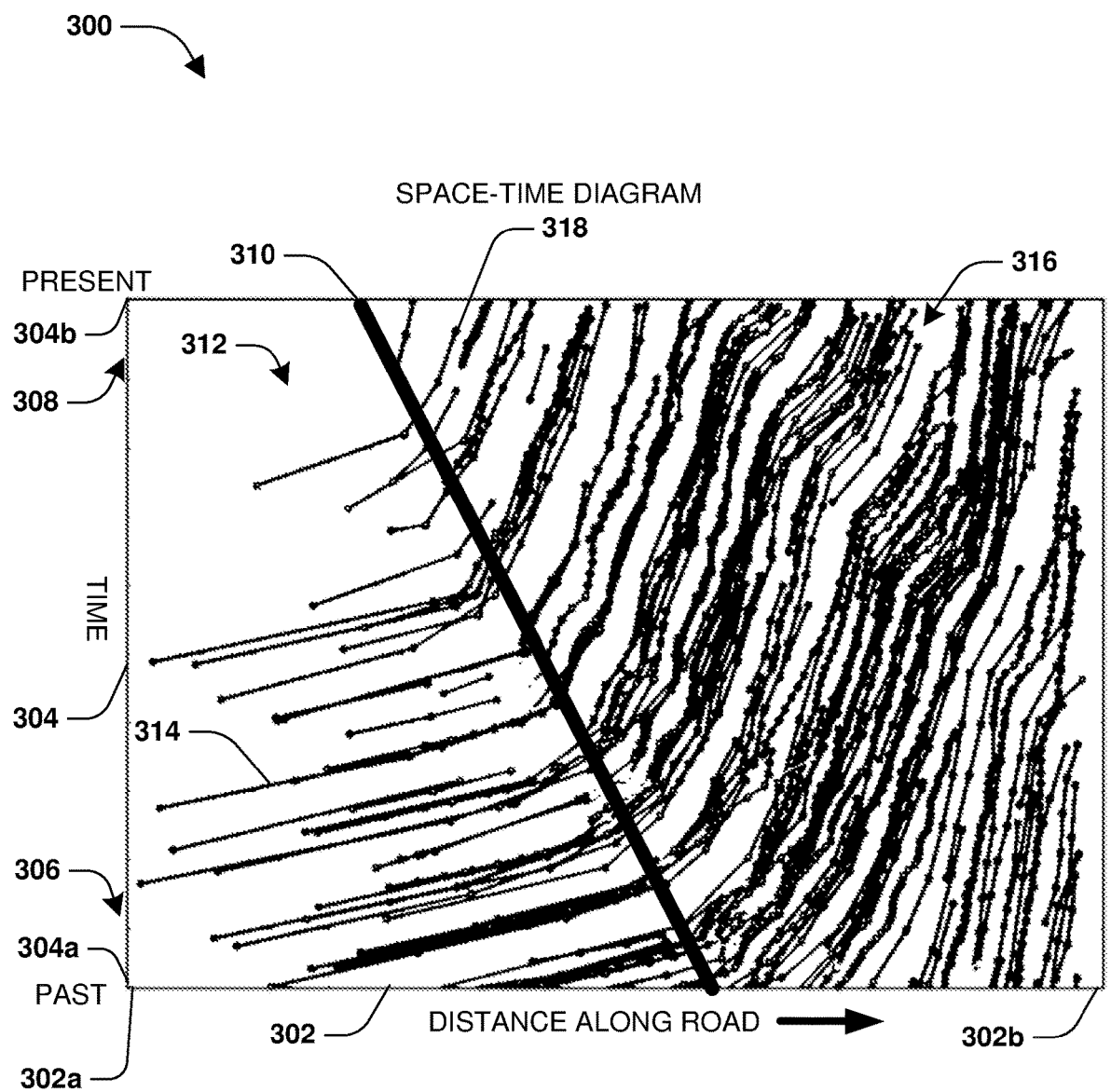
FIG. 3 is an illustration of a space-time diagram that illustrates a slowdown.

FIG. 3 illustrates a second space-time diagram 300 having an x axis 302 representing distance along a second road segment and a y axis 304 representing time. At the origin of the second space-time diagram 300, the x axis 302 represents a starting position 302a of the second road segment and the y axis 304 represents a starting time 304a that occurred in the past 306. The other end of the x axis 302 represents an ending position 302b of the second road segment. The other end of the y axis 304 represents a most recent time 304b of acquired vehicle speed data (e.g., a more present/current time 308). It may be appreciated that any other time periods, start times, and end times may be represented by the y axis 304.

Location data of vehicles traveling the second road segment are plotted within the second space-time diagram 300. The plotted location data for a particular vehicle may represent a trajectory and/or vehicle speed of the vehicle over time. For example, a first trajectory 314 of location data of a first vehicle indicates that the first vehicle is traveling at a free flowing vehicle traffic rate at a first point in time. This is because the first trajectory 314 is more horizontal than vertical and more parallel to the x axis 302 than the y axis 304, thus indicating that the first vehicle is making progress along the second road segment within a reasonable timeframe (e.g., traveling close to a posted speed limit). A second trajectory 318 of location data of a second vehicle indicates that the second vehicle is traveling at a congested vehicle traffic rate at a second point in time. This is because the second trajectory 318 is more vertical than horizontal and more parallel to the y axis 304 than the x axis 302, thus indicating that the second vehicle is making little progress along the second road segment over time (e.g., traveling well below the posted speed limit).

A change in shape of a trajectory corresponds to a change in speed of a vehicle (e.g., a rapid change in slope corresponds to a rapid acceleration/deceleration of a vehicle). For example, the first trajectory 314 indicates that the first vehicle initially travels at a free flow speed at the first point in time, but at line 310, the first vehicle slows down and the first trajectory 314 corresponds to congested traffic flow at a subsequent point in time. Similarly, the second trajectory 318 at a previously point in time indicates that the second vehicle was initially traveling at the free flow speed, but at line 310, the second vehicle slowed down and the second trajectory 318 corresponds to the congested traffic flow at the second point in time.

As will be described later in further detail, the second space-time diagram 300 can be proceeded to determine probabilities that the second space-time diagram 300 illustrates a slowdown or not. With regard to the second space-time diagram 300, a slowdown is illustrated where free flowing vehicle traffic represented by trajectories 312 is coming to a sudden slowdown as congested flow vehicle traffic represented by trajectories 316. Line 310 represents a transition point where the trajectories of free flowing vehicle traffic transition to trajectories of congested flow vehicle traffic. The transition point represents a back of queue of the slowdown where vehicles are starting to experience the slowdown and suddenly slowdown. The slowdown and the location of the transition point (back of queue) is identified using the convolutional neural network 706 as will be described later in further detail.

Figure 4:
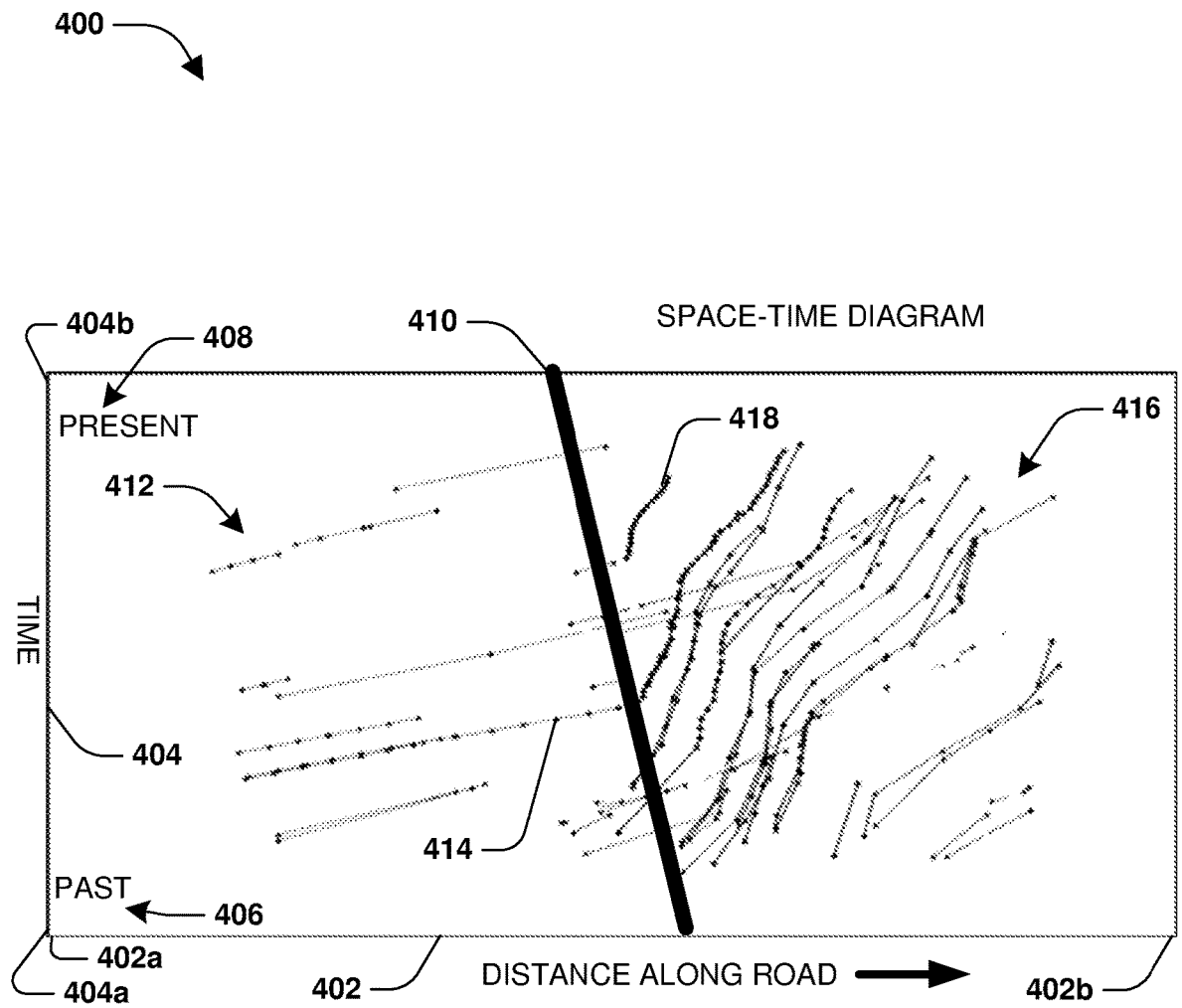
FIG. 4 is an illustration of a space-time diagram that illustrates a slowdown.

FIG. 4 illustrates a third space-time diagram 400 having an x axis 402 representing distance along a third road segment and a y axis 404 representing time. At the origin of the third space-time diagram 400, the x axis 402 represents a starting position 402a of the third road segment and the y axis 404 represents a starting time 404a that occurred in the past 406. The other end of the x axis 402 represents an ending position 402b of the third road segment. The other end of the y axis 404 represents a most recent time 404b of acquired vehicle speed data (e.g., a more present/current time 408). It may be appreciated that any other time periods, start times, and end times may be represented by the y axis 404.

Location data of vehicles traveling the third road segment are plotted within the second space-time diagram 400. The plotted location data for a particular vehicle may represent a trajectory and/or vehicle speed of the vehicle over time. For example, a first trajectory 414 of location data of a first vehicle indicates that the first vehicle is traveling at a free flowing vehicle traffic rate at a first point in time. This is because the first trajectory 414 is more horizontal than vertical and more parallel to the x axis 402 than the y axis 404, thus indicating that the first vehicle is making progress along the third road segment within a reasonable timeframe (e.g., traveling close to a posted speed limit). A second trajectory 418 of location data of a second vehicle indicates that the second vehicle is traveling at a congested vehicle traffic rate at a second point in time. This is because the second trajectory 418 is more vertical than horizontal and more parallel to the y axis 404 than the x axis 402, thus indicating that the second vehicle is making little progress along the third road segment over time (e.g., traveling well below the posted speed limit).

A change in shape of a trajectory corresponds to a change in speed of a vehicle (e.g., a rapid change in slope corresponds to a rapid acceleration/deceleration of a vehicle). For example, the first trajectory 414 indicates that the first vehicle initially travels at a free flow speed at the first point in time, but at line 410, the first vehicle slows down and the first trajectory 414 corresponds to congested traffic flow at a subsequent point in time. Similarly, the second trajectory 418 at a previously point in time indicates that the second vehicle was initially traveling at the free flow speed, but at line 410, the second vehicle slowed down and the second trajectory 418 corresponds to the congested traffic flow at the second point in time.

As will be described later in further detail, the third space-time diagram 400 can be proceeded to determine probabilities that the third space-time diagram 400 illustrates a slowdown or not. With regard to the third space-time diagram 400, a slowdown is illustrated where free flowing vehicle traffic represented by trajectories 412 is coming to a sudden slowdown as congested flow vehicle traffic represented by trajectories 416. Line 410 represents a transition point where the trajectories of free flowing vehicle traffic transition to trajectories of congested flow vehicle traffic. The transition point represents a back of queue of the slowdown where vehicles are starting to experience the slowdown and suddenly slowdown. The slowdown and the location of the transition point (back of queue) is identified using the convolutional neural network 706 as will be described later in further detail.

Figure 5:
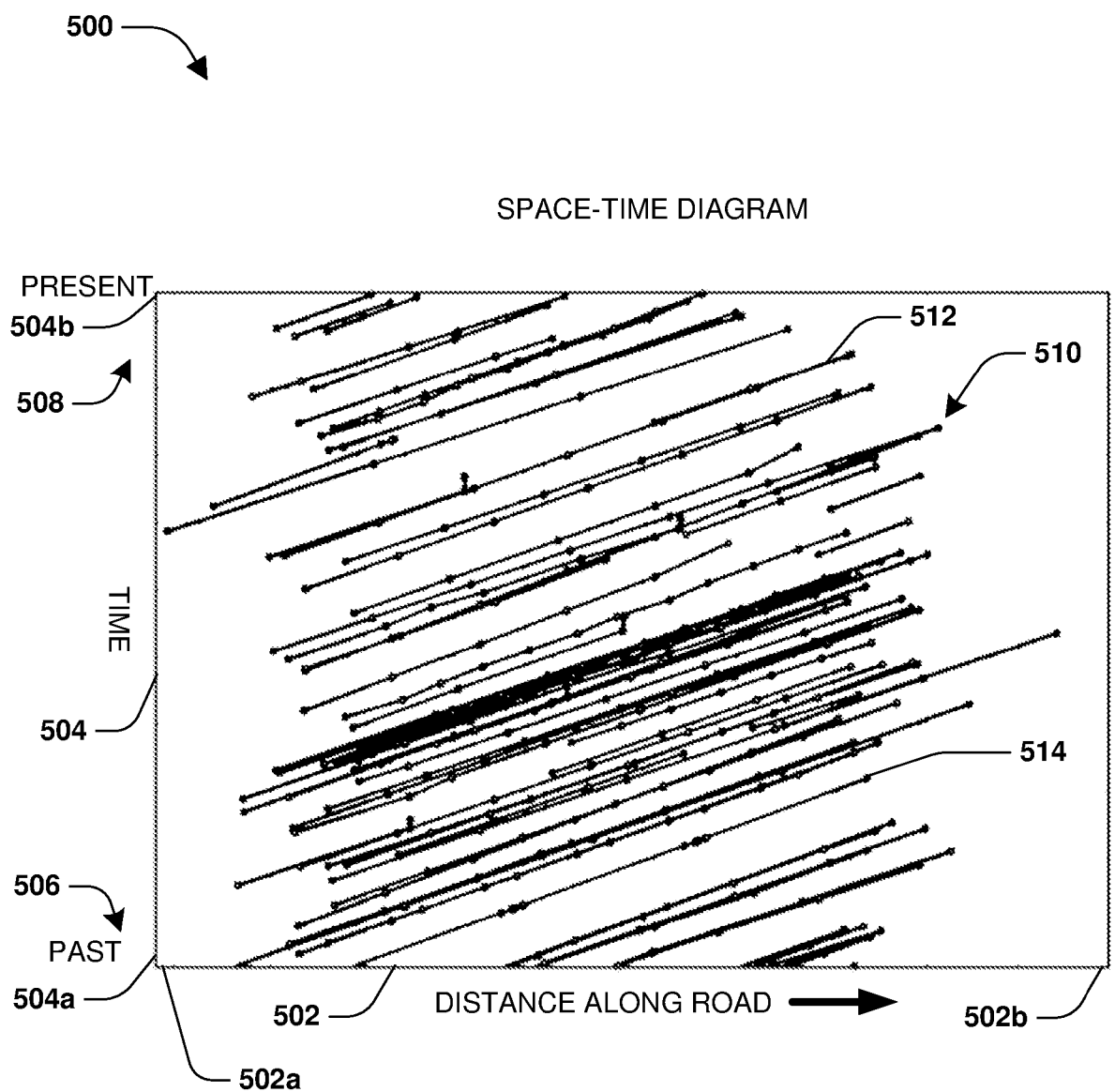
FIG. 5 is an illustration of a space-time diagram that does not illustrate a slowdown.

FIG. 5 illustrates a fourth space-time diagram 500 having an x axis 502 representing distance along a fourth road segment and a y axis 504 representing time. At the origin of the third space-time diagram 500, the x axis 502 represents a starting position 502a of the fourth road segment and the y axis 504 represents a starting time 504a that occurred in the past 506. The other end of the x axis 502 represents an ending position 502b of the fourth road segment. The other end of the y axis 504 represents a most recent time 504b of acquired vehicle speed data (e.g., a more present/current time 508). It may be appreciated that any other time periods, start times, and end times may be represented by the y axis 504.

Location data of vehicles traveling the fourth road segment are plotted within the fourth space-time diagram 500. The plotted location data for a particular vehicle may represent a trajectory and/or vehicle speed of the vehicle over time. For example, a first trajectory 512 of location data of a first vehicle indicates that the first vehicle is traveling at a free flowing vehicle traffic rate. This is because the first trajectory 512 is more horizontal than vertical and more parallel to the x axis 502 than the y axis 504, thus indicating that the first vehicle is making progress along the fourth road segment within a reasonable timeframe (e.g., traveling close to a posted speed limit). A second trajectory 514 of location data of a second vehicle indicates that the second vehicle is traveling at a free flowing vehicle traffic rate. This is because the second trajectory 514 is more horizontal than vertical and more parallel to the x axis 502 than the y axis 504, thus indicating that the second vehicle is making progress along the fourth road segment within a reasonable timeframe (e.g., traveling close to a posted speed limit).

As will be described later in further detail, the fourth space-time diagram 500 can be proceeded to determine probabilities that the fourth space-time diagram 500 illustrates a slowdown or not. With regard to the fourth space-time diagram 500, a slowdown is not illustrated because most trajectories 510 are indicative of free flowing vehicle traffic rates. This is because the trajectories 510 are more horizontal than vertical and more parallel to the x axis 502 than the y axis 504, thus indicating that vehicles are making progress along the fourth road segment within a reasonable timeframe (e.g., traveling close to a posted speed limit).

Figure 6:
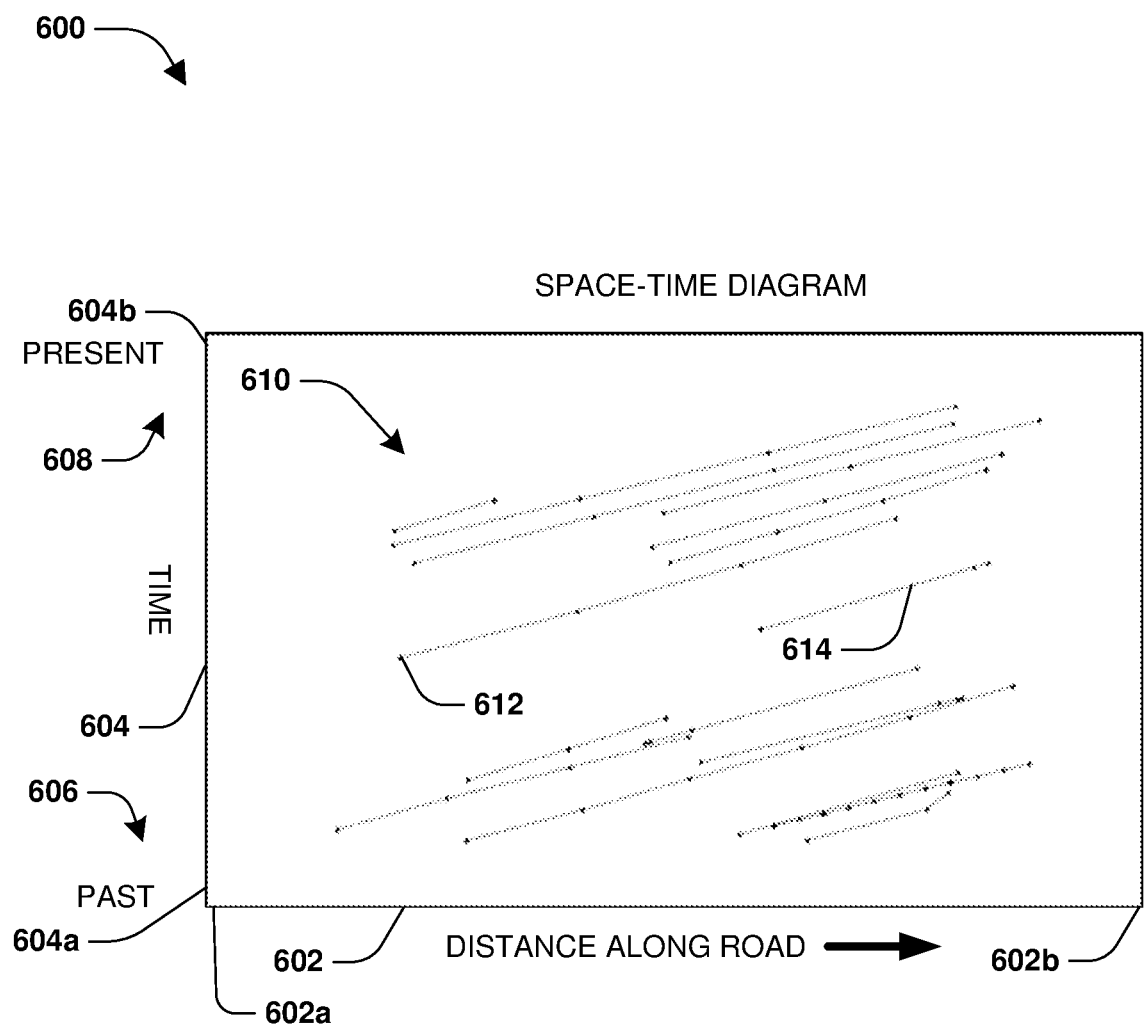
FIG. 6 is an illustration of a space-time diagram that does not illustrate a slowdown.

FIG. 6 illustrates a fifth space-time diagram 600 having an x axis 602 representing distance along a fifth road segment and a y axis 604 representing time. At the origin of the fifth space-time diagram 600, the x axis 602 represents a starting position 602a of the fifth road segment and the y axis 604 represents a starting time 604a that occurred in the past 606. The other end of the x axis 602 represents an ending position 602b of the fifth road segment. The other end of the y axis 604 represents a most recent time 604b of acquired vehicle speed data (e.g., a more present/current time 608). It may be appreciated that any other time periods, start times, and end times may be represented by the y axis 604.

Location data of vehicles traveling the fifth road segment are plotted within the fifth space-time diagram 600. The plotted location data for a particular vehicle may represent a trajectory and/or vehicle speed of the vehicle over time. For example, a first trajectory 612 of location data of a first vehicle indicates that the first vehicle is traveling at a free flowing vehicle traffic rate. This is because the first trajectory 612 is more horizontal than vertical and more parallel to the x axis 602 than the y axis 604, thus indicating that the first vehicle is making progress along the fifth road segment within a reasonable timeframe (e.g., traveling close to a posted speed limit). A second trajectory 614 of location data of a second vehicle indicates that the second vehicle is traveling at a free flowing vehicle traffic rate. This is because the second trajectory 614 is more horizontal than vertical and more parallel to the x axis 602 than the y axis 604, thus indicating that the second vehicle is making progress along the fifth road segment within a reasonable timeframe (e.g., traveling close to a posted speed limit).

As will be described later in further detail, the fifth space-time diagram 600 can be proceeded to determine probabilities that the fifth space-time diagram 600 illustrates a slowdown or not. With regard to the fifth space-time diagram 600, a slowdown is not illustrated because most trajectories 610 are indicative of free flowing vehicle traffic rates. This is because the trajectories 610 are more horizontal than vertical and more parallel to the x axis 602 than the y axis 604, thus indicating that vehicles are making progress along the fifth road segment within a reasonable timeframe (e.g., traveling close to a posted speed limit).

At 105, the convolutional neural network 706 is used to process the space-time diagram 704 to identify a slowdown 707, if present. The convolutional neural network 706 is trained and configured to identify, extract, and evaluate features of space-time diagrams in order to identify slowdowns represented by the space-time diagrams. The features may correspond to shapes of trajectories, angles/slopes of trajectories, counts or percentages of trajectories having certain features, locations of trajectories, changes in slope of trajectories, colors of trajectories, and/or a wide variety of other features that are indicative of slowdowns being illustrated within space-time diagrams or not. In this way, the convolutional neural network 706 processes the space-time diagram 704 to identify the slowdown 707, if present.

In an embodiment, the space-time diagram 704 is processed using the convolutional neural network 706 to output a first probability that the space-time diagram 704 illustrates a slowdown. The convolutional neural network 706 may also output a second probability that the space-time diagram 704 does not illustrate a slowdown. The convolutional neural network 706 is trained to utilize image recognition functionality to evaluate features of space-time diagrams to output probabilities that the space-time diagrams illustrate slowdowns based upon the features (e.g., space-time diagrams labeled as illustrating and not illustrating slowdowns are used to train the convolutional neural network to identify features indicative of slowdowns being illustrated or not within space-time diagrams). The features may correspond to shapes of trajectories, angles/slopes of trajectories, counts or percentages of trajectories having certain features, locations of trajectories, changes in slope of trajectories, colors of trajectories, and/or a wide variety of other features that are indicative of slowdowns being illustrated within space-time diagrams or not.

In an embodiment, at 106, a regression convolutional neural network 706 is used to identify one or more transitions points 708 depicted by the space-time diagram 704. The transition points 708 are where free-flowing vehicle speeds transition to congested vehicle speeds. In particular, the regression convolutional neural network 706 is trained to identify pixels within the space-time diagram 704 that represent transition points (e.g., a back of queue), such as based upon features corresponding to changes in slopes of trajectories and locations of the changes in slope. In an example, the regression convolutional neural network 706 identifies a time series of transition points. A Kalman filter is executed upon the time series of transition points to identify an accurate current transition point and to predict future transition point locations. With having known transition point locations, vehicle speeds are separated into free flow and congested speed clusters. If a difference in median speed of the clusters is greater than a threshold speed, then the slowdown is categorized as a dangerous slowdown or other slowdown category based upon other threshold speeds.

If the probabilities are above a threshold probability and thus indicate that a slowdown is illustrated by the space-time diagram 704, then the current transition point from free-flow speeds to congested speeds is found using a regression convolutional neural network. This transition point is then found for different times and used to construct a time series of transition points. A Kalman filter is applied to this time series of transition points to find a more accurate transition point. Additionally, this Kalman filter also predicts the change of the transition point along the road segment over time.

With the transition point location on the road segment accurately known, the free-flowing and congested vehicle speeds can be separated accurately into two different speed clusters. In an embodiment, a filter, such as a Hampel filter, is applied to each speed cluster to remove outlier vehicle speeds. A difference between a first median vehicle speed of the first cluster and a second median vehicle speed of the second cluster (a speed delta between free flow and congested traffic) is determined. If the difference exceeds a speed threshold, then the dangerous slowdown is identified. Upon identifying the slowdown along the road segment, properties 712 of the slowdown are identified based upon the space-time diagram 704, the clusters, location data, and/or vehicle speed data. The transition point may be converted into longitude and latitude values indicative of a location of the back end of queue where vehicles are suddenly slowing down due to the slowdown. Other properties can be determined such as a time of the slowdown, a predicted time that the slowdown will dissipate, a future location of the slowdown, etc.

In an embodiment, the transition point is identified using a regression convolutional neural network. The regression convolutional neural network may be trained to identify pixels within a space-time diagram that represent a transition point (a back of queue). The regression convolutional neural network is tracked to search for transition points for different times, and outputs positions of the transition points (the back of queue) at different times. A time series of transition points may be constructed. A Kalman filter is applied to the time series of transition points to determine a transition point between free flowing vehicle traffic and congested flow vehicle traffic along the road segment due to the slowdown and predict a future location of the transition point. This will provide a more accurate location of the transition point (the back of queue) at various times. Vehicle speeds may be separate into separate clusters using the transition point (e.g., vehicle speeds collected from vehicles yet to reach the transition point may be clustered in a first cluster and vehicle speeds collected from vehicles that have reached the transition point may be clustered into a second cluster). A difference between the transition point between free flowing vehicle traffic and congested flow vehicle traffic along the road segment due to the slowdown and predict a future location(s) of the transition point are determined. A Hampel filter may be applied to the clusters to remove outlier vehicle speeds. The slowdown is identified based upon the difference between the first cluster median and the second cluster median exceeding a speed threshold (e.g., exceeding 65 kph).

In an embodiment, additional factors may be taken into account when determining whether a slowdown exists along the road segment. A road condition (e.g., construction, an accident, etc.) and/or a weather condition (e.g., snow or rain) for the road segment is used as a factor for determining whether there is a slowdown. Also, historic slowdown occurrences can be taken into account. For example, occurrences of slowdowns for the road segment are tracked as historical data. The historical data is used as a factor for determining whether there is a slowdown (e.g., a road segment having frequent historic occurrences of slowdowns may have a probability of a slowdown increased by a factor of how frequently slowdowns occurred for the road segment).

At 108, a notification of the slowdown is constructed and transmitted over a network to a computing device associated with a driver of a vehicle that is to travel the road segment during the slowdown. In an embodiment, the notification is transmitted to computing devices of vehicles within a threshold distance of a location of the slowdown. The notification may be transmitted to computing devices associated with vehicles that are traveling routes that will encounter the slowdown during a predicted duration of the slowdown. The notification may be constructed to comprise a description of the slowdown (e.g., a number of vehicles affected), an alternative route for avoiding the slowdown, a relatively precise location of the slowdown (e.g., the back of queue location), a current distance of a vehicle to the location of the slowdown, a timeframe of the slowdown, a predicted timeframe of the slowdown dissipating, a predicted future location of the slowdown (e.g., a location of the back of queue by the time the vehicle will be within a threshold distance of the slowdown), etc. Various visual and audible notifications/alerts may be provided by the notification through the computing device. In this way, drivers are provided with adequate notice of slowdowns so that drivers have ample time to safely react to the slowdowns.

In an embodiment, a particular type/degree of slowdown, such as a dangerous slowdown, a moderate slowdown, a continuous spectrum of different degrees of slowdowns, etc. is detected. A type/degree of slowdown may be detected based upon certain properties of the slowdown, the time-space diagram, and/or vehicle location data. For example, a dangerous slowdown is detected if a difference between free flowing traffic speed and congested flow traffic speed (e.g., a transition from free flowing to congested flow traffic, such as a backend of queue of the slowdown where vehicle are abruptly slowing down) is greater than a threshold such as 65 kph or any other threshold speed value. A dangerous slowdown relates to a lack of opportunity for a driver to adequately slowdown in time, which can be identified by slopes of vehicle trajectories within the space-time diagram 704 that correspond to certain amounts of deceleration over short distances. In another example, a continuous spectrum or multiple types/degrees of slowdowns can be identified (e.g., very dangerous slowdown corresponding to 70 kph, a dangerous slowdown corresponding to 65 kph, a moderately dangerous slowdown corresponding to 50 kph, etc.), where each type of slowdown corresponds to a degree or severity of danger of a slowdown. The different degrees/types of slowdowns can be identified based upon different threshold speed values or slopes of vehicle trajectories (e.g., a steeper slope may be indicative of a more dangerous type of slowdown).

Figure 8:
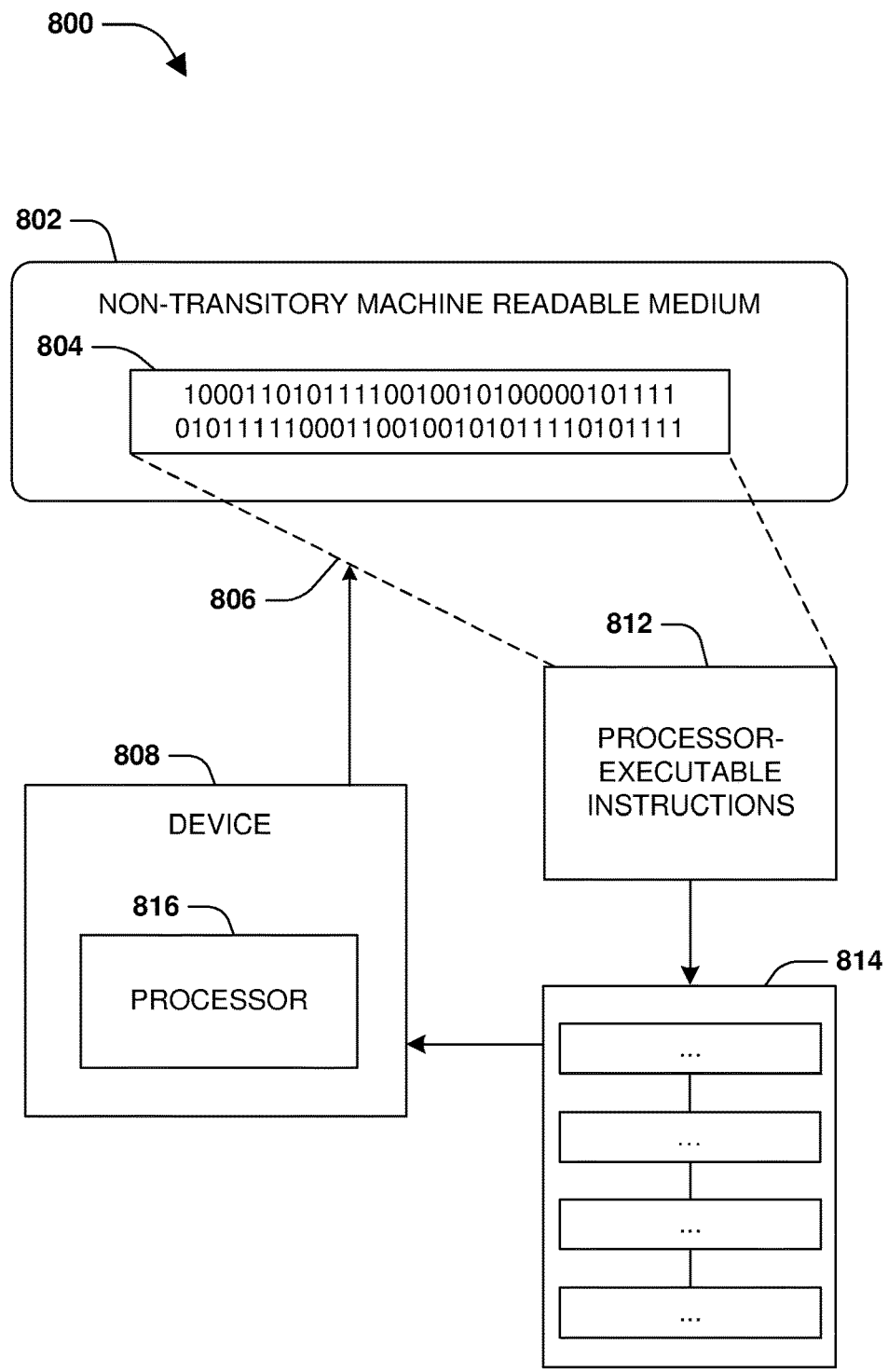
FIG. 8 is an illustration of an exemplary computing device-readable medium wherein processor-executable instructions configured to embody one or more of the provisions set forth herein may be comprised.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a device 808 (e.g., a read head of a hard disk drive, or a read operation invoked on a solid-state storage device), express the processor-executable instructions 812. In some embodiments, the processor-executable instructions 812, when executed cause performance of operations 814, such as at least some of the example method 100 of FIG. 1, for example. In some embodiments, the processor-executable instructions 812 are configured to cause implementation of a system, such as at least some of the example system 700 of FIG. 7, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
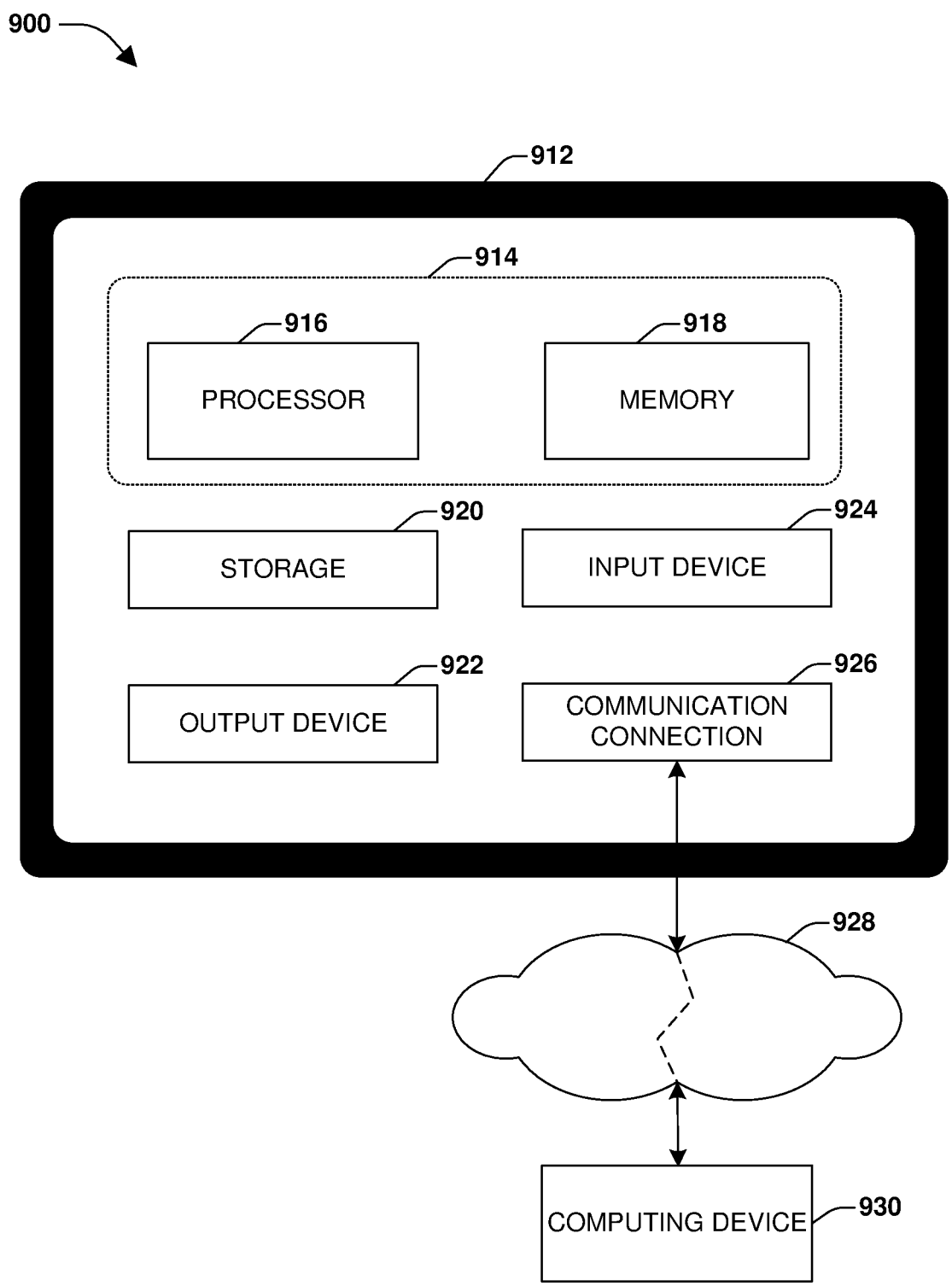
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processor 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processor 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Computer storage media does not, however, include propagated signals. Rather, computer storage media excludes propagated signals. Any such computer storage media may be part of device 912.

Device 912 may also include communication connection 926 that allows device 912 to communicate with other devices. Communication connection 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection 926 may include a wired connection or a wireless connection. Communication connection 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device 924 such as keyboard, mouse, pen, voice input device, touch input device, infrared cameras, video input devices, and/or any other input device. Output device 922 such as one or more displays, speakers, printers, and/or any other output device may also be included in device 912. Input device 924 and output device 922 may be connected to device 912 via a wired connection, wireless connection, or any combination thereof. In one embodiment, an input device or an output device from another computing device may be used as input device 924 or output device 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method involving a computing device comprising a processor, the method comprising:
    executing, on the processor, instructions that cause the computing device to perform operations, the operations comprising:
        evaluating location data received from vehicles traveling a road to identify a road segment associated with vehicle speeds below a threshold;
        generating a space-time diagram comprising a first axis representing distance along the road segment and a second axis representing time, wherein location data associated with the vehicles traveling the road segment are plotted within the space-time diagram, wherein a change in trajectory of a vehicle within the space-time diagram corresponds to a change in vehicle speed of the vehicle;
        processing the space-time diagram using a convolutional neural network trained to utilize image recognition functionality to detect whether space-time diagrams illustrate slowdowns of the vehicles, wherein the convolutional neural network outputs a first probability that the space-time diagram illustrates a slowdown; and
        transmitting a notification of the slowdown to the computing device associated with a driver of the vehicle that is to travel the road segment, wherein the notification is transmitted based upon the first probability indicating that there is a slowdown along the road segment.

2. The method of claim 1, wherein the operations further comprise:
    assigning colors to vehicle trajectories within the space-time diagram, wherein each color corresponds to a different range of vehicle speeds.

3. The method of claim 1, wherein the operations further comprise:
    processing the space-time diagram using the convolutional neural network to output a second probability that the space-time diagram does not illustrate a slowdown; and
    determining whether there is the slowdown based upon the second probability.

4. The method of claim 1, wherein the operations further comprise:
    executing a regression convolutional neural network to construct a time series of transition points based upon features extracted from the space-time diagram; and
    applying a Kalman filter to determine a transition point between free flowing vehicle traffic and congested flow vehicle traffic along the road segment due to the slowdown and predict a future location of the transition point.

5. The method of claim 4, wherein the operations further comprise:
    separating vehicle speeds into separate clusters using the transition point;
    determining a difference between a first median of a first cluster representing free flow traffic speeds and a second median of a second cluster representing slowdown traffic speeds; and
    identifying the slowdown based upon the difference between the first median and the second median exceeding a speed threshold.

6. The method of claim 5, wherein the operations further comprise:
    evaluating the first cluster and the second cluster to identify the transition point where a back of queue of the slowdown is located along the road segment.

7. The method of claim 5, wherein the operations further comprise:
    applying a Hampel filter to the first cluster and the second cluster to remove outliers vehicle speeds.

8. The method of claim 1, wherein the operations further comprise:
    constructing the notification to comprise a location of a transition point between free flowing vehicle traffic and congested flow vehicle traffic along the road segment due to the slowdown.

9. The method of claim 1, wherein the operations further comprise:
    evaluating the space-time diagram and vehicle speed data to predict a time frame of the slowdown dissipating; and
    constructing the notification to comprise the time frame.

10. The method of claim 1, wherein the operations further comprise:
    evaluating the space-time diagram and vehicle speed data to predict a future location of a transition point between free flowing vehicle traffic and congested flow vehicle traffic along the road segment due to the slowdown; and
    constructing the notification to comprise the future location.

11. The method of claim 1, wherein the operations further comprise:
    constructing the notification to comprise a timeframe of the slowdown.

12. A computing device comprising:

a processor; and memory comprising processor-executable instructions that when executed by the processor cause performance of operations, the operations comprising:

evaluating location data received from vehicles traveling a road to identify a road segment associated with vehicle speeds below a threshold;

generating a space-time diagram comprising a first axis representing distance along the road segment and a second axis representing time, wherein location data associated with the vehicles traveling the road segment are plotted within the space-time diagram, wherein a trajectory of a vehicle within the space-time diagram corresponds to vehicle speed of the vehicle;

processing the space-time diagram using a convolutional neural network trained to utilize image recognition functionality to detect whether space-time diagrams illustrate slowdowns of the vehicles, wherein the convolutional neural network outputs a first probability that the space-time diagram illustrates a slowdown; and transmitting a notification of the slowdown to h computing device associated with a driver of the vehicle that is to travel the road segment, wherein the notification is transmitted based upon the first probability indicating that there is a slowdown along the road segment.

13. The computing device of claim 12, wherein the operations further comprise:

constructing the notification to comprise a location of a transition point between free flowing vehicle traffic and congested flow vehicle traffic along the road segment due to the slowdown, wherein the transition point along the road segment is converted into longitudinal and latitude values to identity the location.

14. The computing device of claim 12, wherein the operations further comprise:

identifying at least one of a road condition or a weather condition for the road segment; and factoring in the least one of the road condition or the weather condition when determining whether there is a slowdown along the road segment.

15. The computing device of claim 12, wherein the operations further comprise:

tracking occurrences of slowdowns for the road segment as historical data; and factoring in the historical data when determining whether there is a slowdown along the road segment.

16. The computing device of claim 12, wherein the operations further comprise:

transmitting the notification to other computing devices associated with the vehicles within a threshold distance of a location of the slowdown.

17. A non-transitory machine readable medium having stored thereon processor-executable instructions that when executed by a processor of a computing device cause performance of operations, the operations comprising:

evaluating location data received from vehicles traveling a road to identify a road segment associated with vehicle speeds below a threshold;

generating a space-time diagram comprising a first axis representing distance along the road segment and a second axis representing time, wherein location data associated with the vehicles traveling the road segment are plotted within the space-time diagram, wherein a trajectory of a vehicle within the space-time diagram corresponds to vehicle speed of the vehicle;

processing the space-time diagram using a convolutional neural network trained to utilize image recognition functionality to detect whether space-time diagrams illustrate slowdowns of the vehicles, wherein the convolutional neural network outputs a first probability that the space-time diagram illustrates a slowdown; and transmitting a notification of the slowdown to the computing device associated with a driver of the vehicle that is to travel the road segment, wherein the notification is transmitted based upon the first probability indicating that there is a slowdown along the road segment.

18. The non-transitory machine readable medium of claim 17, wherein the operations further comprise:

transmitting the notification to other computing devices associated with the vehicles that are traveling routes that will encounter the slowdown during a predicted duration of the slowdown.

19. The non-transitory machine readable medium of claim 17, wherein the operations further comprise:

clustering vehicle speeds represented within the space-time diagram using a clustering algorithm;

determining a difference between a first median of a first cluster representing free flow traffic speeds and a second median of a second cluster representing slowdown traffic speeds; and identifying the slowdown based upon the difference exceeding a speed threshold.

20. The non-transitory machine readable medium of claim 19, wherein the operations further comprise:

evaluating the first cluster and the second cluster to identify a transition point where a back of queue of the slowdown is located along the road segment.

* * * * *